United States Patent Office 3,425,416
Patented Feb. 4, 1969

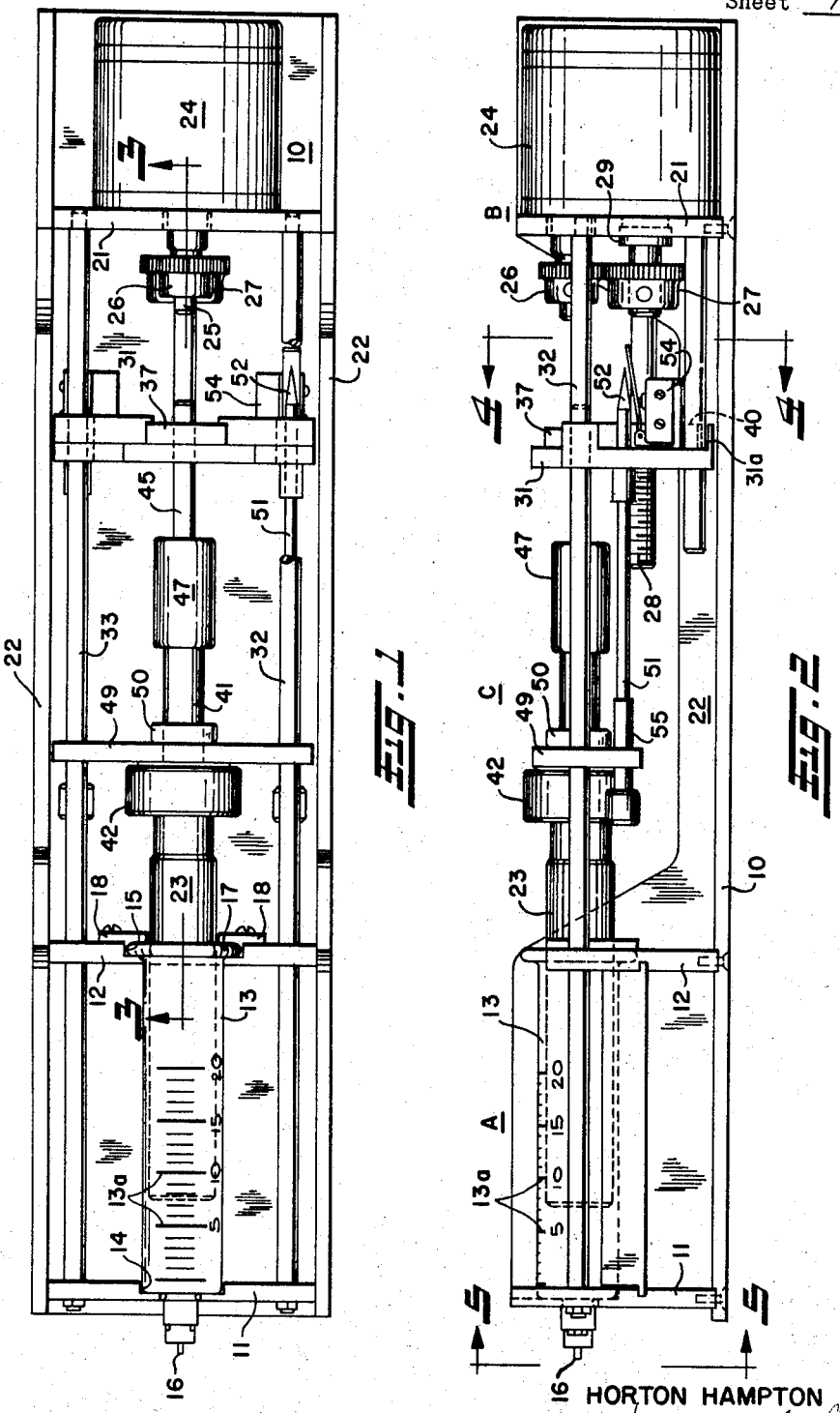

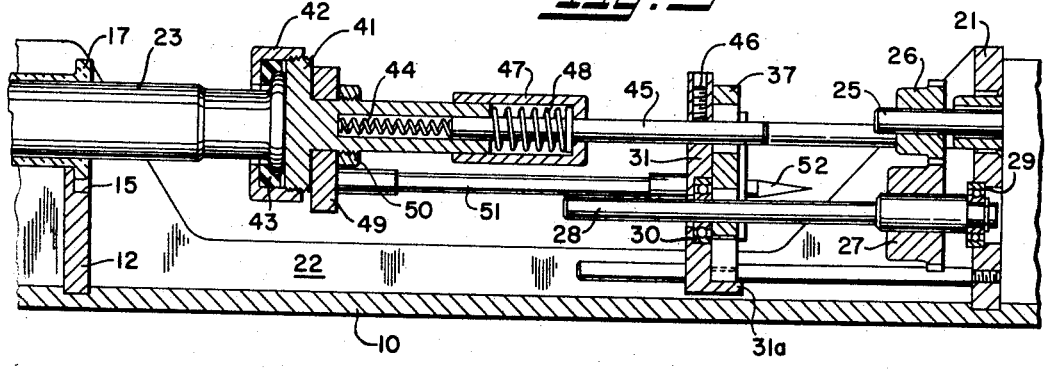
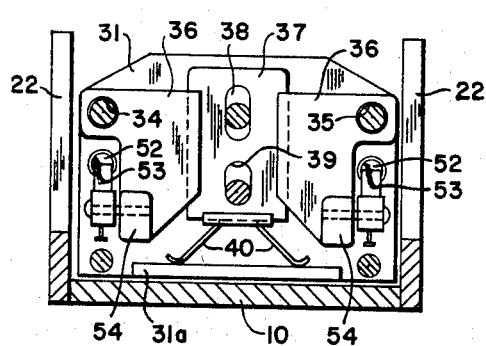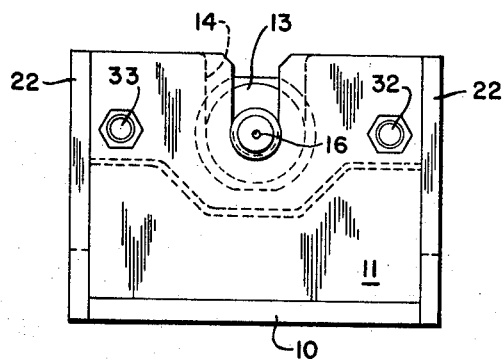

3,425,416
HYPODERMIC INJECTION SYRINGE CONTROLLED BY PRESSURE OF DISCHARGE
Horton Hampton Loughry, 8359 Wilson Mills Road, Chesterland, Ohio 44026
Filed May 23, 1966, Ser. No. 552,277
U.S. Cl. 128—218                                6 Claims
Int. Cl. A61m 5/20; F04b 49/02; F04d 15/00

ABSTRACT OF THE DISCLOSURE

A non-reciprocating, power-operated hypodermic injection syringe or the like for the injection of fluids into patients adapted for intermittent operation in response to the back pressure of its discharge, thereby to avoid exceeding a predetermined maximum discharge pressure. In one form, the hypodermic injection syringe includes a discharge chamber adapted to contain an isolated, batch load. A plunger is adapted for generally unidirectional movement within the chamber by means of power actuation to force a portion of the load from the discharge chamber. Lost-motion control means interconnects the plunger and the power actuation and de-energizes the latter when the back pressure to the discharge from the chamber reaches the predetermined maximum. At this time the motion of the plunger is tentatively interrupted. When the back pressure falls below the predetermined maximum, the lost-motion control means re-energizes the power means to commence once again the unidirectional movement of the plunger so as to discharge fluid from the chamber.

---

In many industrial, clinical, or testing procedures, it is necessary to pump a load, normally a fluid, under carefully controlled pressure conditions so as to insure that the discharge pressure acting on the load does not exceed a predetermined maximum. As a specific instance, in medical technology an injection pump is used to force a liquid into the veins of a leg or arm of a patient. Such a liquid may be lymphangrographic to aid subsequently in the taking of X-rays. A liquid of this nature is quite expensive, necessitating little or no waste in its use. But, more significantly, the liquid must be carefully injected for the safety of the patient under controlled pressure conditions. Should the liquid be admitted at too fast a rate and/or at too high a pressure, over inflation and rupture of veins or glands can result.

It is, therefore, a principal object of the present invention to provide an improved injection pump.

Another object is to provide an injection pump operatively controlled by the pressure of its discharge.

A further object is to provide a power-energized injection pump controlled by the back-pressure of its discharge, so as to de-energize the power operation when the back pressure reaches a predetermined maximum.

A still further object is to provide a fluid injection pump adapted for use on human patients wherein the fluid is safely administered under controlled pressure conditions.

Other objects and advantages of the present invention will be apparent from the following description and accompanying drawings wherein:

FIGURES 1 and 2 are plan and side elevational views, respectively, of one form of the present pump;

FIGURE 3 is a fragmentary, longitudinal section of FIGURE 1 on the line 3—3;

FIGURE 4 is a transverse section of FIGURE 2 on the line 4—4; and

FIGURE 5 is a left hand end view of FIGURE 2.

In general, the form of the invention illustrated by the drawings includes a discharge chamber adapted to release a "load," which is normally a liquid, generally indicated in FIGURE 2 at A; power means adapted to deliver the load from the discharge chamber, generally indicated in FIGURE 2 at B; and control means interconnecting the discharge chamber and the power means and adapted to de-energize the latter in response to a predetermined back pressure, generally indicated in FIGURE 2 at C.

More particularly, referring to the drawings and discussing these general areas in succession, a platform 10 supports the entire apparatus. A pair of upstanding plates 11 and 12, secured to the platform 10, cradle a cylindrical discharge chamber 13 within generally semi-circular recesses 14 and 15 at the upper edges of the plates 11 and 12. Both recesses 14 and 15 extend through the plates and have laterally offset portions of increased radii to define a nesting place for the chamber 13. Thus the left hand portion of the chamber 13 (as viewed in FIGURE 1) rests in recess 14 and protrudes its delivery or exit end 16 beyond the plate 11. A flange 17 of the chamber 13 rests in recess 15, the main tubular body of the chamber extending beyond the plate 12. The recesses 14 and 15 thereby opposed thrust of the chamber 13 to the left as viewed in FIGURE 1, while tabs 18 detachably secure the plate 12 against the flange 17 to resist thrust of the chamber 13 to the right. Reinforcing bars 32 and 33 pass through suitable openings in the plates 11 and 12 and terminate in an end plate 21 to rigidify the entire structure. Side walls 22 are suitably secured to the side edges of plates 11, 12 and 21. The discharge chamber 13 which may conveniently be a hypodermic syringe, bears indicia generally indicated at 13a to indicate volume, and contains a reciprocal plunger or piston member 23.

The power means, generally indicated at B, includes a standard electric motor 24 whose output shaft 25 drives through cooperating spur gears 26 and 27 a threaded rod 28. The latter is journaled for rotation at one end in a bearing 29 in the end plate 21 which is fixed to the platform 10 and against which the motor 24 abuts. A free end of the rod 28 is journaled for rotation in a bearing 30 (FIGURE 3) in a carrier plate 31. This plate is mounted to travel toward the discharge chamber 13 on spaced support rods 32 and 33 which are fixed to the plates 11 and 21 and pass freely through matching openings 34 and 35 (FIGURE 4) in the carrier plate 31 and slide guides 36.

A rearwardly turned ledge 31a on plate 31 carries a vertically adjustable slide 37 held against the plate 31 by the slide guides 36 (FIGURE 4). The slide 37 has two vertically extending elliptical openings 38 and 39. Spring levers 40 fixed to the bottom of the slide 36 rest against the ledge 31a and are of such length as normally to push the slide 37 upwardly until the lower edge of opening 39 contacts threads of the rod 28 (FIGURE 4).

The control means interconnecting the discharge chamber 13 and attendant parts with the power means includes a T-shaped member 41 whose head is butted against the flanged end of the plunger 23 and held in position by an annular cap 42 which presses an elastomeric washer 43 against the flanged end while threadibly engaging the threaded periphery of the T-head of the member 41. The shank portion of this member is hollow to receive a compressible, coiled spring 44 and a compressing rod 45. The latter passes through an opening in the carrier plate 31, in which the rod is secured as by a set screw 46, and also through an elliptical opening 38 in the slide 37. Resistance to the compressive action between the T-member 41 and the rod 45 may be increased, if desired, by securing an inwardly turned end of a tube 47 to the rod 45 and telescopically positioning the tube 47 about the end of the stem of the T-member 41, with a second coil spring 48 occupying the annular area thus defined about the rod 45 (FIGURE 3).

A cross-piece 49 abuts against the head of the T-member 41 and is held in place by a nut 50 threadibly engaging the stem of the T-member. The cross-piece 49 has openings freely to receive the reinforcing side bars 32 and 33 and supports one or more probing fingers 51 which extend toward the carrier plate 31 and terminate in tapered tips 52. The plate 31 has openings 53 (FIGURE 4) to pass the fingers 52. Just below such openings, the carrier plate supports a conventional, normally closed limit switch 54 effective to open and close the circuit energizing the motor 24.

In operation, a flexible tube (not shown) or other like conductor connects the outlet 16 of the discharge chamber 13 to a point of use, for example, to a hypodermic needle for injection into a patient's vein. The motor 24 is energized by conventional means. Since the spring levers 40 urge the slide 37 upwardly, the bottom edge of the elliptical opening 39 engages the threaded rod 28. Accordingly, as the motor 24 rotates the rod 28, the carrier plate 31 is propelled to the left as viewed in FIGURES 1 and 2. During this action, the carrier plate 31 and slide guides 36 ride the side rods 32 and 33 through the openings 34 and 35 which freely engage the rods.

As long as the back pressure to the load being discharged at the exit 16 of the chamber 13 is less than that required to compress the coiled springs 44 (and 48 when both are used), the described travel of the carrier plate 31 also moves the plunger or piston member 23 to the left, thus continuing the discharge from exit 16. When the back pressure at the exit 16 reaches a value greater than that required to compress spring 44 and/or spring 48, compression of the springs begins with the result that there is a "lost motion" as the compressing rod 45 becomes more deeply telescoped within the tubular shank portion of the T-shaped member 41. The axial collapse or compression of the member 41 about the rod 45 (and tube 47) brings the carrier plate 31 and the flanged end of the piston member 23 closer together.

Attendant this "lost motion" action, the probing fingers 51 reach and extend through the openings 53 in the carrier plate 51 to a point substantially that shown in FIGURES 1, 2 and 3, where the tapered tips 52 of the fingers trip the limit switch 54. This action interrupts the current to the motor 24 and tentatively stops the delivery of a load from the chamber 13 through the exit 16. As the back pressure to such discharge decreases, the energy is stored in the compressed springs 44 and/or 48 forces the plunger 23 and carrier plate 31 apart. This, in turn, retracts the probing fingers 51 away from the limit switches 54, thereby closing the circuit to the motor 24 and once more repeating the action substantially as described.

Although two limit switches are shown, it is possible to operate the present pump with only one limit switch. It is also possible to use two limit switches as shown in the drawings with the attendant cooperating finger probes wherein one switch must be depressed to interrupt the circuit to the motor as described, while the other switch must be released again to energize the motor. This use of dual switches may be preferred to provide a time lag in restarting the motor. Also, two or more switches like the switches 54 may be staggered axially with respect to each other along the longitudinal axis of the pump so as to operate sequentially and provide the desired lag in restarting operation.

It is sometimes desired to vary the degree of back pressure needed to deenergize the motor 24 in the manner described. Adjusting or spacing of the probing fingers 51 with respect to the switches to achieve this variance is easily accomplished by the present apparatus. It is necessary only to rotate the fingers 51 in internally threaded sockets 55 secured to the crosspiece 49. Indeed, by rotating each of the two illustrated probing fingers a different amount so as to position the tips 52 at different distances from the cross-piece 49, the described sequential operation may also be obtained, even though two limit switches are used and spaced directly opposite to each other transversely of the apparatus.

The present apparatus may also be easily adjusted in order to reset the pump and refill the discharge cylinder 13. For example, by pushing the slide 37 so as to spread apart the spring levers 40, engagement between the threaded rod 28 and the lower elliptical opening 39 is broken. Thereafter, the carrier plate 31 may be freely moved in either direction longitudinally of the entire apparatus to a new station, normally back toward the motor 24. Upon releasing the slide 37 when the carrier plate 31 is in a new position, the opening 39 again engages the rod 28 and the apparatus may be operated as previously described.

It will now be apparent that the present invention provides an improved injection pump and particularly one which is operatively controlled by the pressure of its discharge. This is accomplished by de-energizing power means when the back pressure reaches a predetermined maximum. The pump is especially adapted for use on human patients wherein a fluid is safely administered under controlled pressure conditions.

I claim:
1. A non-reciprocating, power-operated hypodermic injection syringe or the like for the injection of fluids into patients adapted for intermittent operation in response to back pressure of its discharge, thereby to avoid exceeding a predetermined maximum discharge pressure, said injection syringe including:
  (a) a discharge chamber having an exit and adapted to contain an isolated, batch load to be discharged therefrom,
  (b) a plunger adapted for generally unidirectional movement within said chamber toward said exit,
  (c) power means to move the plunger generally unidirectionally and force at least a portion of the load from said exit, and
  (d) lost-motion control means interconnecting the plunger and power means and adapted to de-energize the power means when the back pressure to the discharge of said load from said chamber reaches said predetermined maximum, whereby the motion of the plunger is tentatively interrupted within the discharge chamber, and to re-energize the power means when said back pressure falls below said predetermined maximum pressure, thereby to restart the movement of the plunger in said chamber and discharge of the load from said exit,
  (e) said lost-motion means being an axially collapsible member, said power means having switch means effective to de-energize the power means, and the lost-motion means including tripping means adapted to operate the switch means upon a predetermined amount of axial collapse of the lost-motion means.

2. The syringe of claim 1 wherein said power means includes a carrier having a connecting rod and adapted for travel toward the plunger, said lost-motion means interconnects said connecting rod with the plunger, said switch means is positioned with respect to the carrier, and said tripping means is an arm extending from the lost-motion means toward the carrier and effective to trip said switch means upon said predetermined amount of axial collapse of the lost-motion means.

3. The syringe of claim 2 wherein said carrier can be adjustably positioned along its path of travel toward the plunger without substantially altering the relative positions of the other defined components.

4. The syringe of claim 2 wherein said carrier is a plate having an opening, said power means includes a rotatable threaded rod extending through and normally engaging an edge of said plate opening, thereby to effect said travel of the carrier upon rotation of said rod, the plate being further adapted for adjustable positioning along said rod without altering the relative positions of the other defined component parts.

5. The syringe of claim 1 wherein said tripping means is adjustably positioned with respect to said lost-motion means to regulate, the degree of back pressure needed to operate the switch means.

6. The syringe of claim 2 wherein said carrier is a plate having an opening, said power means include a rotatable threaded rod extending through and normally engaging an edge of said plate opening, thereby to effect said travel of the carrier upon rotation of said rod, said plate being movable laterally of said rod and said plate opening being oversized with respect to the diameter of said rotatable rod, whereby the plate may be moved out of engagement with the rod for adjustable positioning of the carrier longitudinally of said rod without altering the relative positions of the other defined component parts.

References Cited

UNITED STATES PATENTS

| 2,602,446 | 8/1952 | Glass et al. | 128—218 |
| 2,702,547 | 2/1955 | Glass | 128—218 |
| 3,155,090 | 11/1964 | Holter | 128—218 XR |
| 1,103,569 | 7/1914 | Davidson | 103—38 |
| 2,029,780 | 2/1936 | Mazer et al. | 103—211 |
| 2,105,093 | 1/1938 | Noble | 103—38 |
| 2,458,821 | 1/1949 | Anderson et al. | 103—38 |
| 2,505,975 | 5/1950 | Landon | 103—38 XR |
| 2,821,981 | 2/1958 | Ziherl | 103—211 XR |
| 3,269,319 | 8/1966 | Dargas | 103—25 |

FOREIGN PATENTS 621,208   6/1948   Great Britain.

WILLIAM L. FREEH, *Primary Examiner.*

U.S. Cl. X.R.

103—25